Figure 1:
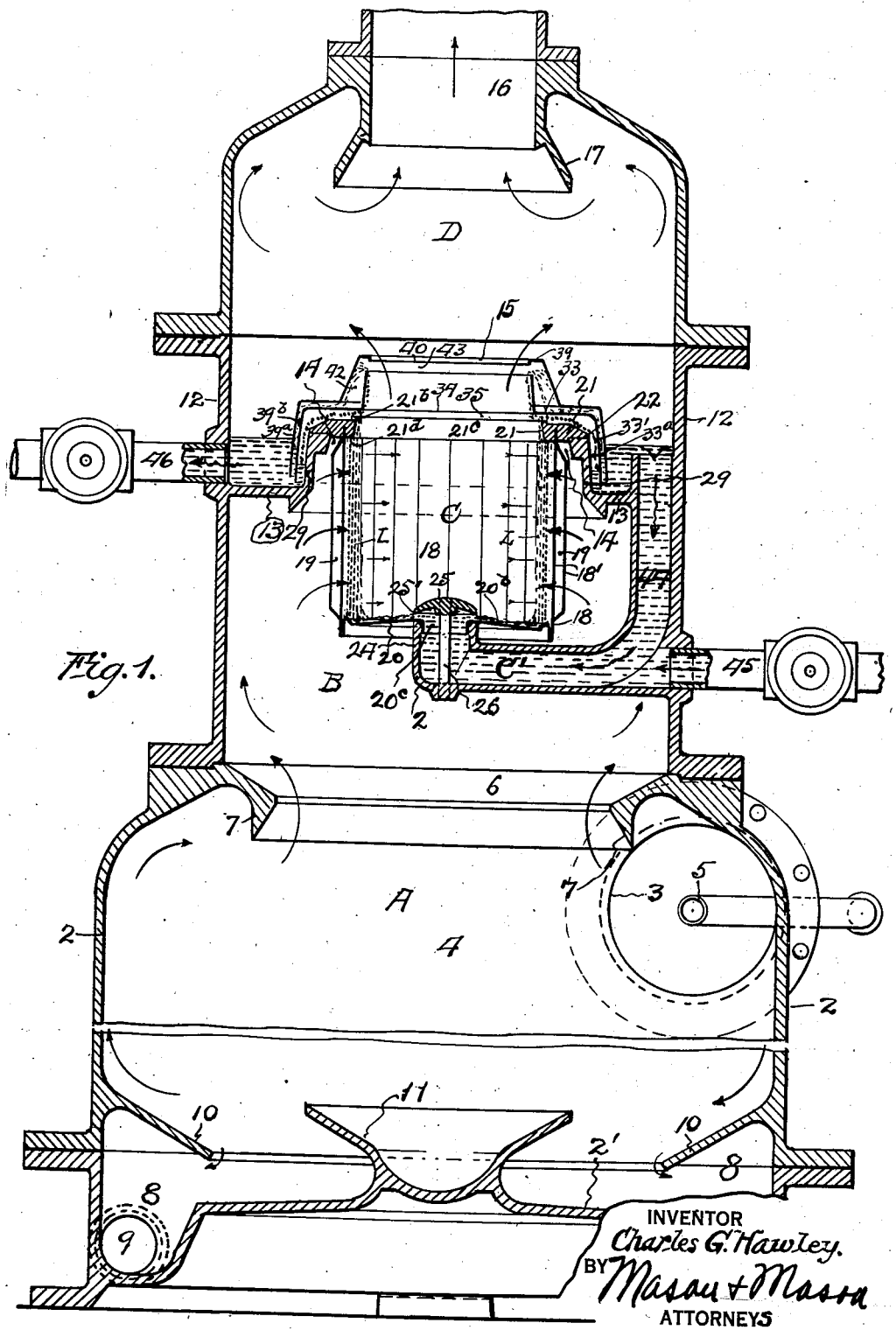

March 30, 1937.  C. G. HAWLEY  2,075,344
CONTACTING PROCESS AND APPARATUS
Filed Jan. 22, 1934   6 Sheets-Sheet 1

INVENTOR
Charles G. Hawley.
BY Mason & Mason
ATTORNEYS

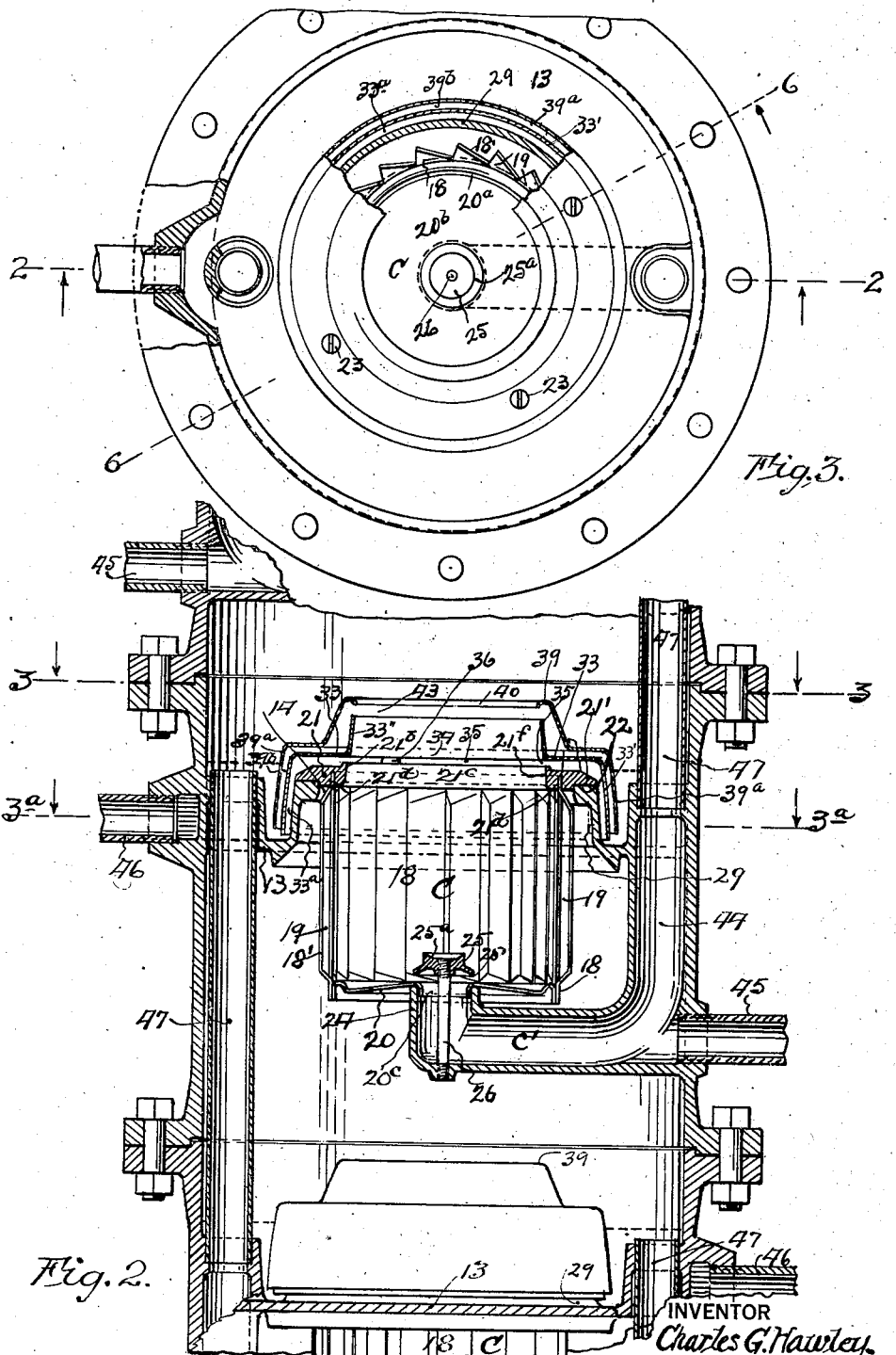

March 30, 1937.   C. G. HAWLEY   2,075,344
CONTACTING PROCESS AND APPARATUS
Filed Jan. 22, 1934   6 Sheets-Sheet 3

INVENTOR
Charles G. Hawley.
BY Mason + Mason
ATTORNEYS

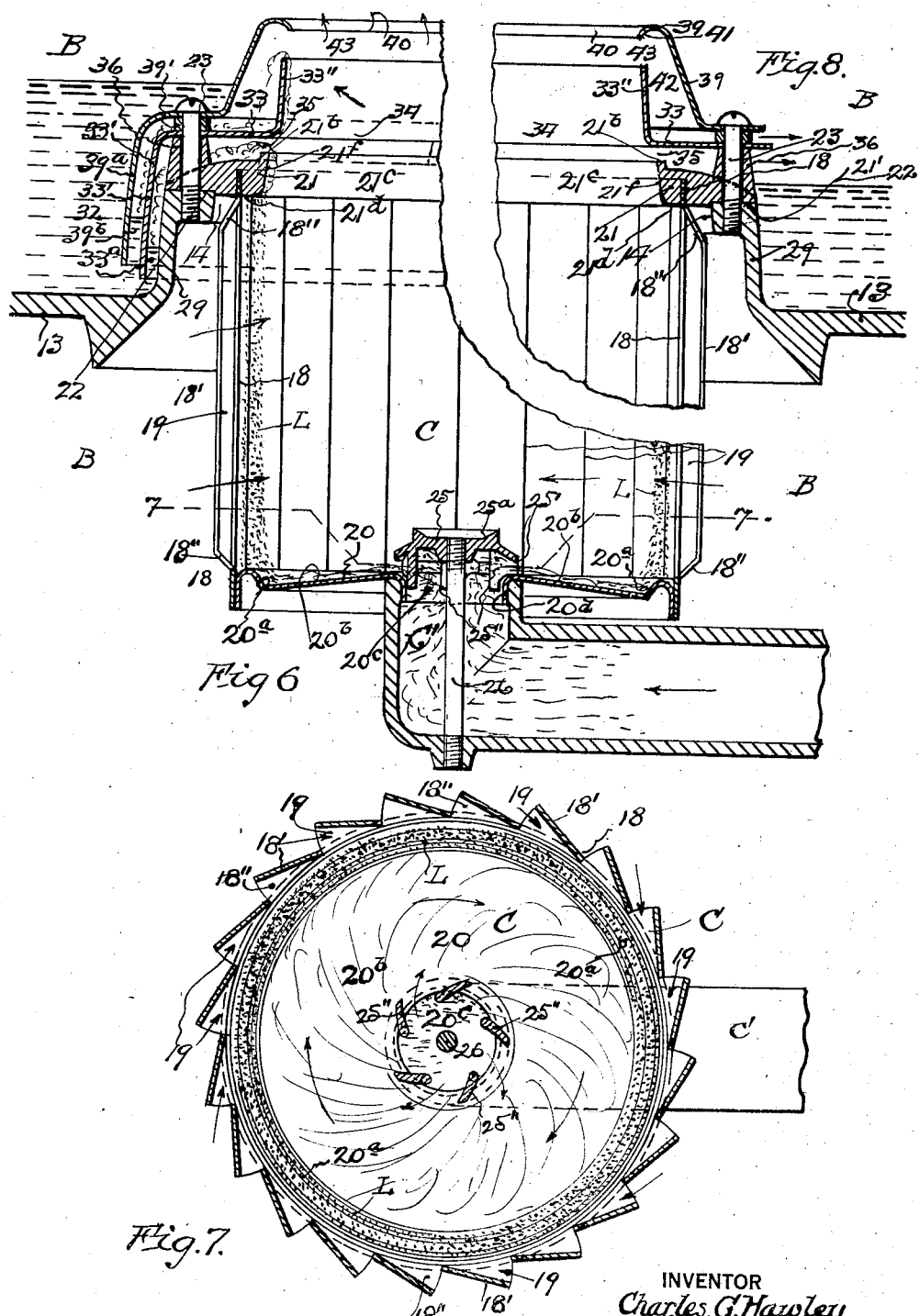

March 30, 1937. C. G. HAWLEY 2,075,344
CONTACTING PROCESS AND APPARATUS
Filed Jan. 22, 1934 6 Sheets-Sheet 5

INVENTOR
Charles G. Hawley.
BY Mason & Mason
ATTORNEYS

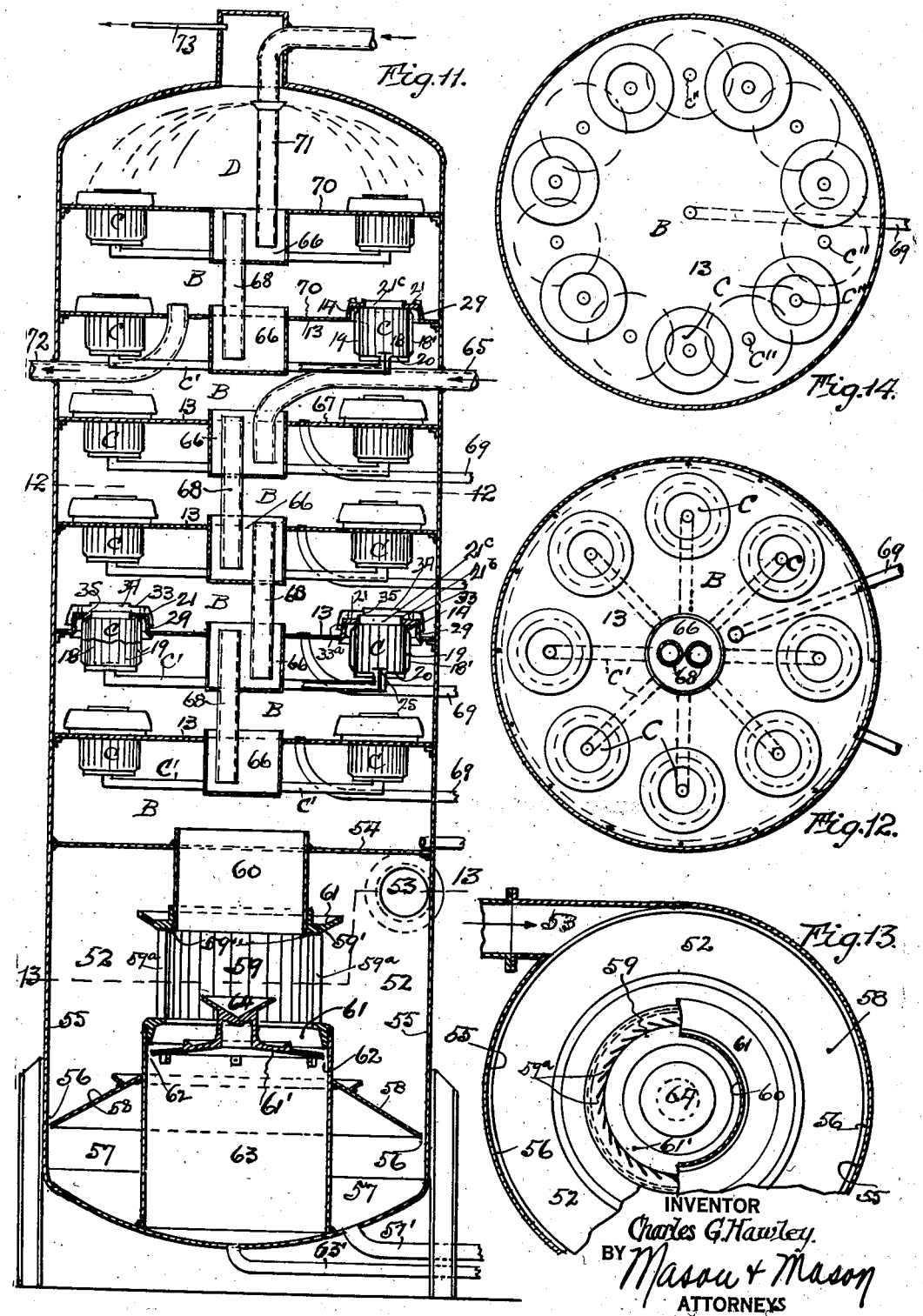

Patented Mar. 30, 1937

2,075,344

UNITED STATES PATENT OFFICE 2,075,344

CONTACTING PROCESS AND APPARATUS

Charles Gilbert Hawley, Chicago, Ill., assignor to Centrifix Corporation, Cleveland, Ohio, a corporation of Ohio Application January 22, 1934, Serial No. 707,803

29 Claims. (Cl. 261—79)

This invention relates to and comprises improvements in and applicable to the practice of the art of continuously mixing or contacting matter in a gaseous condition and swift motion, with matter in a liquid phase, as required to modify one or both; for example, as in the distillation and fractionation of petroleum and the like, in the condensation of vapors; in cleaning, dehydrating, cooling and humidifying air, gases, and vapors and in absorption processes; all such being comprehended by this invention. Concurrently, the invention relates to and comprises improvements in the art of progressively and abruptly terminating such contact or admixture, to the end that the gaseous and liquid matters shall be separately discharged in conditions best suiting them to immediate use or further treatment.

The object of the invention is to enforce and accomplish momentary intimate contact between every part of a gaseous stream and a liquid prescribed for contact or combination therewith, to accomplish such progressive contact and subsequent separation within much less space than usual and by a minimum expenditure of force; and in general, to obtain the required results in better degree, with greater certainty, more quickly, and, more economically than hitherto possible; and, by means of apparatus of simplified form and low cost, capable of accurate and easy control. With reference to the distillation of complex liquids such as petroleum, coal tars and the like, which are vaporized before contact with reflux liquid is undertaken, my object is to more quickly and certainly produce fractions or distillates of required purity and composition, and to ensure sharp cuts between fractions with fewer stages of contact. In other cases a mere exchange of heat or properties may comprise the object, while in others the purpose will be to modify the condition of the liquid; or in contrast, to accomplish either progressive or complete condensation of hot vapors.

For sake of brevity, the term "gas" will be employed as meaning any matter existing in the gaseous phase, including simple and complex vapors as well as air and fixed gases. The term "liquid" will comprehend all matters in the liquid phase, and suitable or prescribable for contact or admixture with the gas.

Primarily, the present invention is concerned with the mutual treatment of gas and liquid in a state of flow, swift movement being requisite. Both fluids are supplied through suitable passages or piping and various operations or processes may be performed within any chamber or casing suited to the kind and condition of the fluids selected for contact, admixture or exchange.

In the past, such contacts have been attained by spacious diffusion and slow admixture at low velocity within large or extended spaces, as in the instance of direct contact and jet condensers and in the instance of fractionating towers with their large chambers, liquid trays and bubble caps. The work has also been attempted by coarse admixture and protracted motion within extended piping, and by forcible beating together of the fluids within suitable passages. Many limitations and deficiencies are apparent in the older methods and apparatus; now seen to be slow and uncertain in the matter of uniformity of contact and also in the matter of obtaining desirably sharp separations between the products of such contact, and compelling needless and expensive corrective operations.

In sharp contrast to all older methods this invention consists in atomizing the liquid and at high velocity passing the gas through a mass, veil or wall composed of densely assembled and slowly advancing liquid particles derived from such atomization comminution. Following the intimate contact thus obtained and which results in liquid and gaseous products of definite nature, such products are immediately and completely separated, thus conditioning each for the disposition to which it is best suited.

Figure 4:
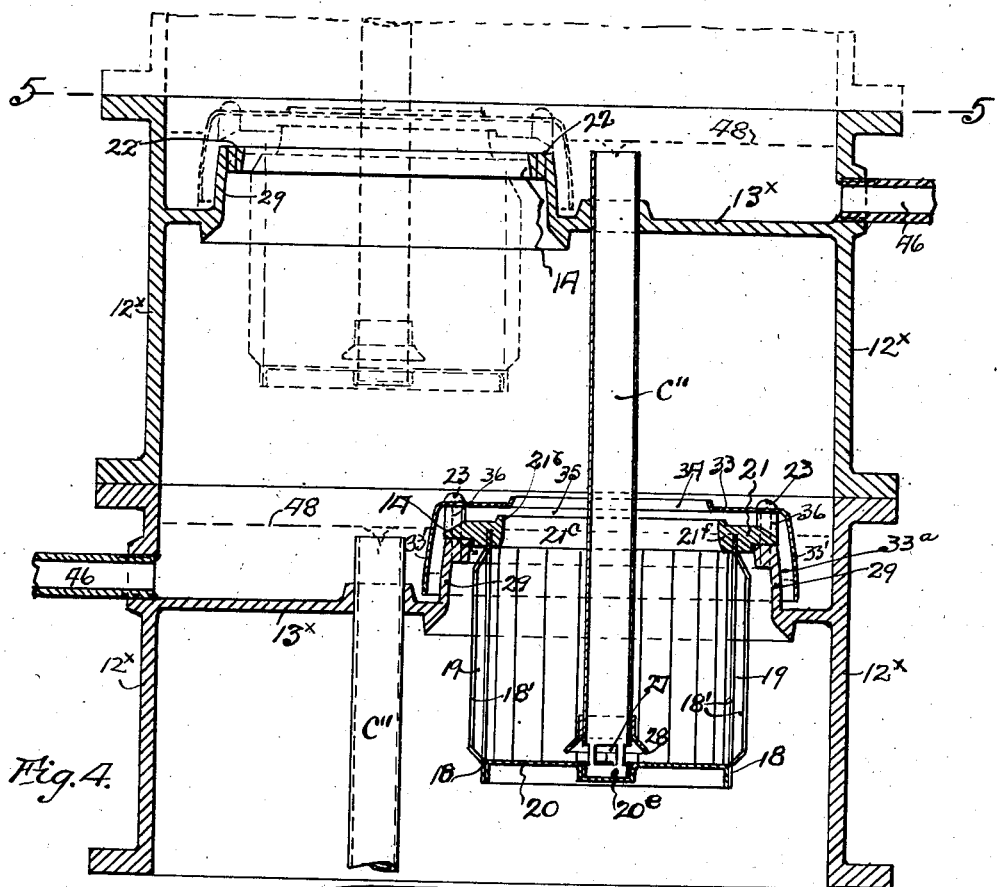
Figure 5:
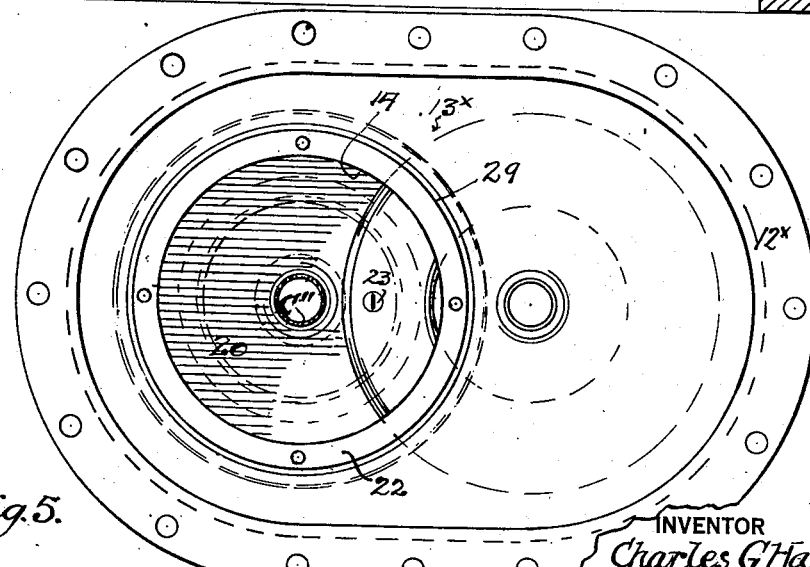
Figure 10:
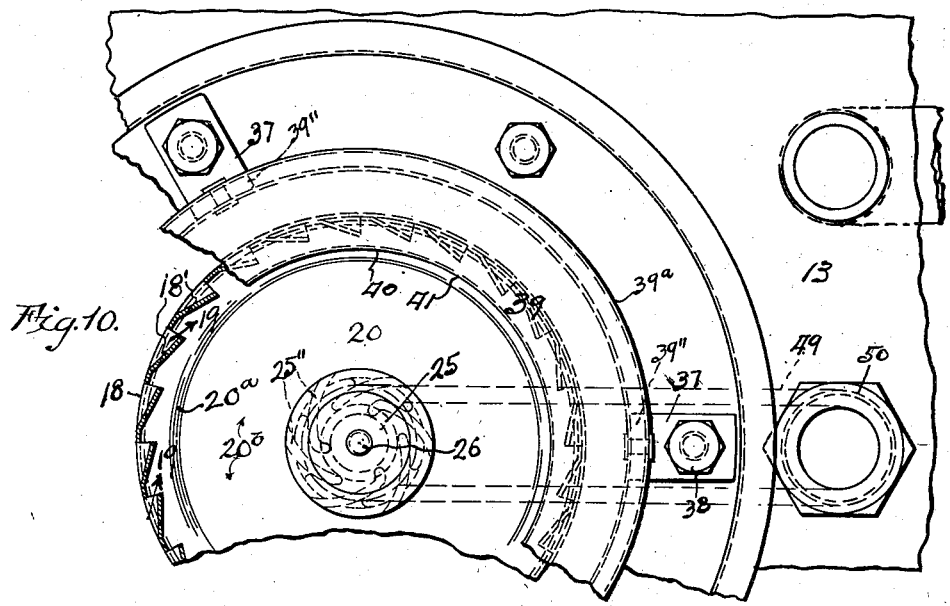
Figure 9:
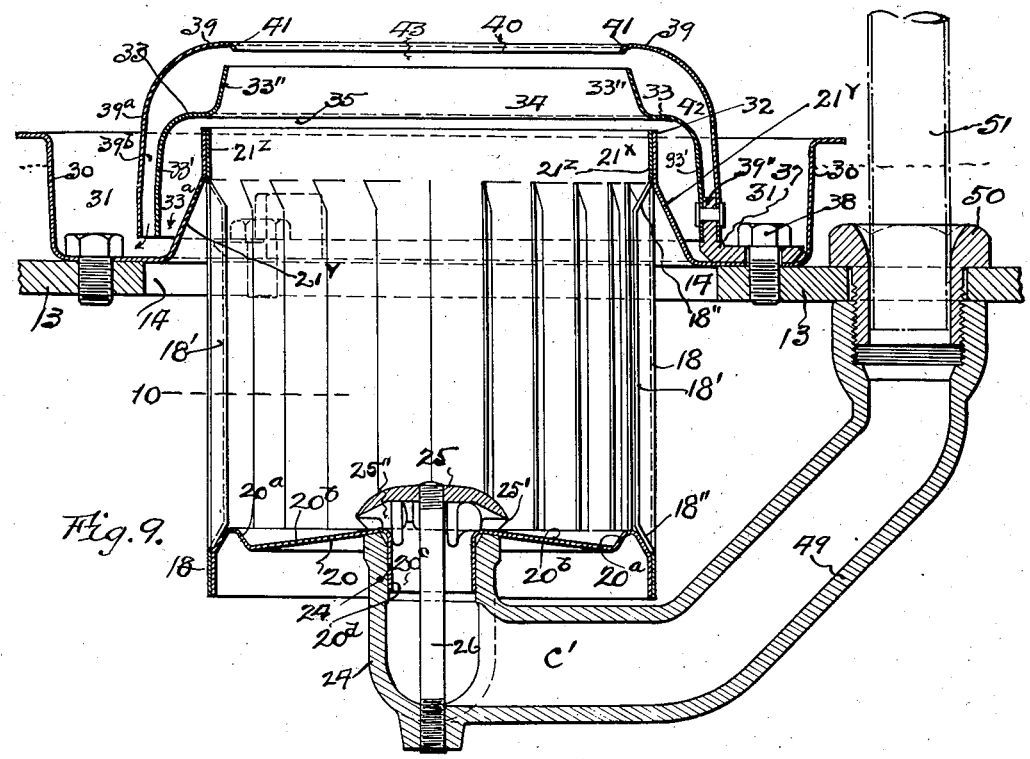

Both my novel process and my novel apparatus will be clearly understood upon reference to the following detailed description taken in conjunction with the drawings that form part of this specification: in which drawings Fig. 1 is a vertical section diagramming the substance and operation of this invention, both process and apparatus, the latter containing one of the described contact compartments;—Fig. 2 is a fragmentary view illustrating a plurality of said compartments, as arranged for operation in series, each compartment containing a contact enforcing unit;—Fig. 3 is a plan view of one said compartment or tower section taken from the line 3—3 of Fig. 2, and partly in section upon the line 3a—3a of Fig. 2;—Fig. 4 is like unto Fig. 2 but illustrating a staggered arrangement of the contact units in successive compartments of the column;—Fig. 5 is a plan view taken upon the line 5—5 of Fig. 4;—Fig. 6 is an enlarged fragmentary vertical section of one of the contact enforcing units, as upon the line 6—6 of Fig. 3;—Fig. 7 is a horizontal section upon the irregular line 7—7 of Fig. 6;—Fig. 8 is a fragmentary section illustrating a modified form of the top of the said unit;—Fig. 9 is like unto Fig. 2 but illustrates a modified form and construction of the contact enforcing and separating unit;—Fig. 10 is a fragmentary plan and sectional view, the body, tuyère or whirl-promoting portion of that unit being sectioned upon the line 10—10 of Fig. 9;—Fig. 11 is a sectional elevation illustrating the preferred components of a complete fractionating tower or column, including condenser sections and otherwise embodying the various elements of the present invention;—Fig. 12 is a horizontal section, as upon the line 12—12 of Fig. 11;—Fig. 13 is a horizontal view, upon the irregular section line 13—13 of Fig. 11;—Fig. 14 is like unto Fig. 12, but illustrates a staggered arrangement of the novel units in adjacent sections or compartments of the tower or column.

The apparatus which I have devised for use in the practice of the above described process is capable of employment in any direction of gas flow. It may accommodate either upward or downward flow of the gas or may parallel the ground. However, it seems best to treat gases while flowing upward and all the drawings illustrate the apparatus so positioned.

Including both novel process and requisite apparatus, this invention is of a vortical or vortexial nature or character. In brief, the gas and the liquid are opposed and admixed while in a state of rapid whirling motion. The forces required are derived from the movement of the gas itself and it will be noted that the apparatus includes no moving or rotating parts. Upon reference to the drawings it will be seen that in each case an upwardly leading gas passage is divided into stories by one or more horizontal floors or partitions, each floor containing one or more relatively small openings. Each such opening is occupied by a so-called whirl promoting tuyère—an appliance having a closed bottom and an open top and the sides of which are made up by a plurality of equally spaced so-called tangential blades. The gas ascends slowly beneath one of the floors and, obviously, is compelled to pass through the blading of the tuyère and thence upwardly through the open top of the tuyère and into the next space. This forcing of the gas through a constricted passage under the directional control of the tangential blading causes the gas to whirl within the tuyère at high velocity; in other words, swift whirling motion is imparted to the gas while in localized or compacted condition. This term "compacted" is employed, together with the term "whirling", to differentiate this invention from former practices, as instanced by the operation of bubble caps, and these terms conveniently describe the essential use of the gas in a manner to liberate or present an energy which is to be employed for the breaking up, comminution, or atomization of reflux liquid or the like and the ultimate elevation of one or more liquid products to and through the open top of the tuyère. It will be understood that the gas is in continuous flow through the described tuyère and the whirling motion which is occasioned by the tangential entrance of the gas into the tuyère, results in establishing or maintaining a whirling body or vortex of gas within the limited gas duct which is formed by the described tuyère body.

Again referring to the drawings, it will be noted that the described tuyère is associated with means by which liquid may be fed centrally or axially into the body of the tuyère and thus positioned to be readily broken up or atomized by the forces of the gas streams, which whirl within the tuyère. As best suited to this purpose, the liquid is fed into the lower or base portion of the tuyère; in other words, into the lower part or base portion of the gaseous vortex. As will be explained later, the liquid may enter the body of the tuyère either from the top or the bottom thereof.

The process (as differentiated from the apparatus) may now be described as follows:

As explained, the liquid, fed centrally into the described vortex of whirling gas, is thereby and at once effectively broken up, comminuted, or atomized; thus developing a heavy fog of liquid within the gaseous vortex. Then the spiralling movement of the gas toward its outlet serves to elevate the liquid particles. Thus by the force of the moving gas the before-mentioned foraminous liquid wall is always dependably maintained in the whirling and upwardly spiralling path of the gas. Clearly, a cylindrical wall of finely atomized liquid is thus constantly maintained in opposition to the passage of the gas. The centrifugal forces developed within the limiting passage or tuyère prevent objectionable inward displacement of the particles, by the force of the entering gas; and thus cause the escaping spiral movement of the liquid particles to be slow. The action is akin to holding rain stationary within a passing hurricane and the liquid fog is held in the path of the gas persistently, until slowly displaced in an upward direction, or until depleted by gaseous absorption or by vaporization if the gas be hot. Meantime, liquid derived from the gas by condensation or otherwise, and always in the form of particles, is centrifugally added to or retained in the whirling, foraminous wall of liquid particles, taking on the same whirling progress toward the outlet.

Next in sequence and progressively, the liquid particles spirally expelled from the described space or zone of active admixture and by means of the residue of whirling motion, or gathered centrifugally into mass form and are ejected laterally, (outwardly from the axis) in advance of the escape of the modified gas. The liquid thus ejected is continuously collected in a region sufficiently remote to prevent its re-entrainment by the escaping gas. Leaving the liquid resultant behind in this manner the treated gas is permitted to escape (is whirlingly discharged) in a "dry" state, wholly or substantially free from liquid particles and hence ideally conditioned for immediate use or further treatment. The ejected liquid is removed as collected and is employed in another or repeated stage of the same process or is withdrawn as a side stream; as dictated by the purposes of the particular operation being performed.

Apparently the movements and effects here described can be accomplished in no other way. The opposed centripetal and centrifugal forces (of gas entrance and gas whirl) being essential, not only to the breaking up of the supplied liquid but to the holding of the liquid particles long in the path of the passing gas; and for the immediate collection and discharge of the liquid or liquids remaining after the described contact. It is important also that the gas, only a moment before deluged with liquid (in the contact stage described), is completely separated and prevented from reentraining liquid.

While other gas and liquid contacting processes are injured by high gas velocities and are limited to slow movement of the gas in the presence of atomized liquid, as within compartments of an ordinary fractionating tower, the present invention utilizes a very swift movement of the gas under confinement with the liquid, and makes the swift movement highly desirable and beneficial because the swift whirling movement of the closely confined gas ensures the fine pulverization or atomization of the supplied liquid and such confinement compels a long and most intimate contact between the opposed liquid and gas. After such contact the gas and liquid are discharged or liberated and at that time the swift whirling movement is made to cause the prompt and effective centrifugal separation of the liquid and gaseous products of the operation.

With much improvement in the effects desired, this process or operation may be conducted in apparatus much smaller and less costly than that heretofore employed.

Proceeding as here described, it becomes possible to accomplish either complete or incomplete evaporation or transference of any liquid thus held in the path of a moving gas; and to impart heat or other properties from any hotter fluid to a cooler fluid, the extent of heat exchange being directly controlled by the relative heats of the opposed fluids, and the transfer of substances and properties being governed by the relative absorptive capacities of the different fluids.

Clearly, the invention is ideally suited to that most difficult of processes, to-wit, the distillation and fractionation of petroleum and like complex liquids. In such cases the liquid to be distilled is first vaporized, as in a still, and is thereafter opposed to a reflux or condensing liquid. If the quantity of cooler liquid supplied be too small to absorb the heat available in the passing vapor and if the latter has a temperature above the boiling point of the selected liquid, then substantially all of the liquid will be converted into vapor at reduced temperature and the liquid product of the described process will be limited to condensed original vapor. When an excess of liquid is supplied for this compacted contact with the hot vapor then only part of the liquid will be absorbed or vaporized and the remainder will be discharged along with the condensate of the original vapor.

This invention comprehends the employment of such vapors with liquids which are either miscible or immiscible with the vapor condensate and hereunder an immiscible liquid may be used for the production of vapor condensates more truly representative of the ruling temperatures. In such cases the liquid product of the process may be a mixture of immiscible liquids, which however, are readily separable by gravity in any suitable container.

Special attention is called to the fact that while a rapid admixture of liquid and gas is ordinarily accomplished only with considerable loss in the pressure that occasions the movement of the gas, such action is here accomplished at little cost, the energy consumed in the described vortical and centrifugal operation being slight in measure. The reason for this economy appears to reside in the tendency of thus agitated liquid to break up and form into fine drops or liquid particles. Such breaking up of the liquid is here brought about by its first impact with the whirling gas and, once the liquid is so sub-divided, the particles tend to remain separate and in a state of suspension within the whirling gas stream and little energy is expended in retaining them in that state or in raising them to the point or zone of collection and discharge.

Whatever the explanation, it is characteristic of this invention that the steps of atomization, contact and separation may now be conducted with less than the usual pressure drop. This is another way of saying that in the case of a fractionating column a lower pressure can be maintained in the base thereof; with obvious advantage to and in the evaporating still which furnishes the hot vapor to the column. Further, by reason of this better control and exchange and because inter-stage liquid entrainment is prevented, fewer steps or stages are required for the production of a given number of petroleum fractions, or in any like performance.

Other precise characteristics of the invention as variously practiced, and the best forms of its apparatus, will now be explained in detail.

Fig. 1 of the drawings is here employed to illustrate a complete gas and liquid contacting apparatus which best includes a base portion A adapted to receive and clean the gas; next, a contacting compartment B with its contact enforcing unit C, and finally, a gas collecting and exit dome D. There may be several of the contact compartments B, arranged one upon the other, as illustrated in Figs. 2, 4 and 11; and as there indicated each such compartment will contain one or several of the contact enforcing units, according to the volume of the gas to be treated, or reversely, to be used in the treatment of a given quantity of liquid.

A complete apparatus, as in Fig. 1, is best characterized by a base portion which is a centrifugal separator, receiving the gas through a tangential entrance or inlet 3 and functioning to relieve the gas of entrained liquid or solids before permitting it to rise to the liquid contact stage; which latter is usually expected to produce a pure liquid product. The column base of Fig. 1 has a large central outlet 6 in its top, preferably framed by a part 7 that functions as a vortex-defeating cone to prevent the passage of gas entrained substances from the upper part of chamber 4. Instead the whirling gas with any burden of impurities is caused to move downward and must reach the central or axial portion of the chamber 4 before it starts upward. The bottom of that chamber contains a collecting groove 8 and the latter is defended from the direct force of the whirling gas by a so-called whirl damping flange 10 that extends inward and downward from the outer wall 2 of the base. The heavy substances are thus collected and centrifugally deposited in the groove 8; and are discharged through its drain opening 9, connected with a suitable receptacle (not shown). Erected on the bottom 2' is another vortex defeating cone 11 that prevents axial re-entrainment of impurities by the gas whirling upward from that level. The operation of these vortex cones is made clear in and by my earlier patents which include such elements.

The described column base is representative of apparatus which should be employed to prepare the gas for fractionation, condensation or the like, and because of the importance of this element it is amplified and again represented in Fig. 11 to which attention will be directed.

The compartment B of Fig. 1 is defined by the encompassing wall 12 and is an open passageway leading from the gas admission orifice 6. That passageway, comprising the compartment B, is divided into upper and lower parts, as by the transverse floor 13, which latter contains the smaller opening 14. That opening is occupied by the contact enforcing unit C which includes means for copiously feeding liquid to its interior, all as hereinafter described in detail. The unit C is generally cylindrical and smaller than the compartment B and itself terminates in an outlet orifice 15 which is still smaller. The liquid is thrown out of the unit before that orifice is reached and, in the manner hereinafter described, is lodged upon the floor 13, the upper part of the compartment B serving to contain the ejected liquid.

The gas having been treated in the unit C whirls upward into the larger compartment or dome D and may depart through the ample outlet 16. Preferably that outlet is defended by another vortex defeating cone 17. In some cases a volume of vapor passing through this apparatus is reduced by condensation but in the same measure is augmented by vapor derived by the evaporation of the supplied liquid. The large outlet 16 is characteristic of such cases. In other cases the outlet of the dome D may be represented by a relatively small offtake, as for fixed or non-condensible gases that must be removed in order to maintain a vacuum.

The contact enforcing passage of this invention is best designed as a complete self-contained unit, and is so designed, to the end that any required number thereof may be applied in and upon the floor of any given compartment. As remarked, it is here essential that the gas shall move swiftly while under treatment, and in a practical sense this means that the diameter of the unit should always be small with relation to the size of containing casing or column. When a single unit is not adequate even at high velocity the number of units should be increased; for example, as illustrated in Fig. 11. Nevertheless, the unit capacity is so high that even very large quantities may be handled through towers which are of much smaller diameter than equivalent towers now in use. Primarily, this is brought about by getting rid of former limitations upon the average speed of gas ascent, which has always been extremely low lest entrainment of liquid from floor to floor be great and subsequent products suffer from contamination.

Attention is now directed to the preferred constructions of the contact-enforcing unit plus that of its contact-terminating appliance, as shown in the drawings. Upon comparison of Figs. 1 to 7 with Figs. 9 and 10 it will be seen that units of two designs are provided. The unit of Figs. 1 to 7 is especially adapted to maintain within itself a thick or heavy wall of liquid particles while the unit of Figs. 9 and 10 is of a type in which the liquid wall is thinner. The unit of Figs. 1 to 7 is of the type providing a protracted retention of the atomized liquid, desirable in many fractionating columns, strippers, absorbers, and condensers; whereas a unit of the type of Fig. 9, although employable in fractionating towers, condensers and the like, may be preferred in many humidifiers, mixers, dehydrators, after-coolers and the like. Obviously, units of the Fig. 1 type also may be used in those cases. Indeed, these contact units are generally applicable in the arts, including the drying, cleaning and tempering of gases and the gasification and tempering of liquids; use is by no means limited to the specific applications herein named. Further, the contact unit with its liquid feeding component may be used to advantage without the liquid separator. Its combination however with such instant liquid separator enlarges the field of utility.

Except in rare instances the entire unit is composed of metal, and in some cases all of its parts and walls may be of the thickness characteristic of different castings; but practically, and particularly if the unit is to be used under high temperatures it is desirable that the metal content and total weight of the unit be minimized; and this is done not only to save expense but especially to avoid the cooking or coking of solids thereon. Thus the cylindrical, whirl-promoting body of the unit, C, is thin walled; likewise it has a thin bottom and most conveniently these are pressed metal parts, capable of economical production. This is likewise true of the separator forming hood portion of the unit, as will be apparent from the face of the drawings. Parts likely to be less exposed to heat or likely to be roughly handled, may be of heavier section and by preference become substantial top castings, as clearly shown in Figs. 1 to 8.

On referring to the enlarged Figs. 6 and 9 it will be seen that the body portion of the contact enforcing tuyère or unit preferably comprises a thin walled metal part 18 preferably of cylindrical shape and sheared and pressed to present a large number of relatively narrow but long integral blades. All those blades are inclined in the same direction, completing a circumferential series; and being so inclined, form an equal number of long, narrow or slot-like tangential gas entrance openings 19. The device as a whole is termed a whirl promoting tuyère, it being obvious that the moving gas, deflected by the outer faces of the blades 18' and entering through the slot-like tangential openings, forms overlapping tangential gas streams and must needs take on a whirling motion within the body portion 18. By preference, the blades are integrally formed so that no fastenings are required between them. By preference, also, they are characterized by the inclined triangular sections 18" which form the ends of the slots 19, making the structure amply rigid when held in the gas stream.

This whirl promoting tuyère constitutes the restricted or constricted gas passage before mentioned. The exact shapes of the parts 18 and 19 may be modified to suit the designer's purpose but in all designs, whether of cylindrical, tapered or bulbous formation, the blading and principle of this whirl promoting tuyère will be retained and the described whirling motion of the flowing gases will take place.

The blade forming portions 18' are of less length than the body 18, leaving solid end portions for the attachment of the bottom-closing part 20. That part is circular and disc-like and preferably is formed of thin pressed metal and in inverted position fits within the lower end of the tuyère portion 18. As a rule it will be fastened in that position but if desired it may be merely telescoped therein, particularly when the liquid connection rises through the bottom of the tuyère, as in Figs. 1, 6 and 9.

The bottom 20 joins the bladed wall substantially in the plane of the lower ends of the tuyère openings 19 (see Figs. 6 and 9). Said bottom may be flat, as in Figs. 4 and 11, but as hereinafter described the bottom functions as a liquid atomizing surface and to facilitate the breaking up of the liquid, the bottom is best characterized by an annular deflecting rib or surface 20a, inward from the bladed wall, as shown in Fig. 6 and others. Further, the central portion of the part 20 is best formed as a low pitched cone 20b, beginning at the part 20a and rising toward the center. The liquid to be used with the gas, in all unit forms shown is fed to or through the center of said bottom, which causes the liquid to move outward from the axis and in the form of an easily broken sheet or film. In all forms, the accumulation of any considerable depth of liquid upon the bottom 20 should be avoided, the abrupt and substantially flat bottom and the thin sheet of liquid here described best serving the purposes sought and avoiding the formation of large drops which might be expelled upward from the bottom 20 and through the open top of the unit.

As shown in Figs 1, 2, 6, 9 and 11 the bottom 20 contains a central liquid admission hole 20c marked by a downturned flange 20d, the latter conveniently being part of the joint between the contact unit proper and the duct or connection C', through which the component liquid is supplied thereto. The latter will be described hereinafter. The liquid feeding component of Figs. 4 and 5 comprises a central tube C'' functioning in the same manner and the lower end of which is stepped in a central sink 20e, which takes the place of the hole 20c in the other unit.

The top member 21 of the unit of Figs. 1, 2, 4 and 6 comprises a cast metal ring wherein the upper part or edge of the member 18 is embedded in the process of casting the ring. Thus a firm and tight joint is completed between the ring 21 and the body portion of the unit. The ring provides the means for suspending and fastening the unit in aforesaid hole 14 in the compartment floor 13. Its under surface 21' is shaped as shown and is seated upon the margin 22 of said opening 14. The ring, and hence the unit as a whole, is conveniently secured by means of bolts or screws 23, making tight the joint between the unit and the liquid collecting floor 13.

For quick drainage, the top 21a of the cast ring 21 is preferably inclined outward and downward and preferably is distinguished by a raised liquid departure lip 21b, the latter forming the top margin of the relatively large central opening 21c of the ring. The opening 21c is coaxial with the space within the body portion and as shown in the several figures, is of considerably smaller internal diameter. The purpose in this last is to provide the inwardly extending annular abutment 21d, to which further reference will be made, the same being of a special importance in relation to the formation and retention within the unit of a thick, foraminous, liquid wall.

As illustrated in all of the drawings, the liquid intended for contact with the gas is fed upon the bottom or floor 20, either centrally downward through the top or centrally upward from beneath and is caused to spread within and across the bottom or lower part of the unit, to form the said foraminous, liquid wall. Two methods are here provided for feeding the liquid; first, a so-called internal method as illustrated in Figs. 4, 5 and 14; and second, what may be termed an external method as illustrated in the other figures of the drawings. Various sources from which the liquid may be drawn will be described later.

Again referring to Figs. 1, 2, 6, 7, and 9 it will be noted that the external liquid feeding duct C' takes the form of an upturned elbow 24 the top of which receives the central flange 20d of the unit bottom. The supplied liquid flows upward through the elbow and opening 20c and there encounters the before mentioned spreader which, in the case of Fig. 6, comprises a small circular part 25 so to speak covering the hole 20c and spaced from the bottom 20, to limit the outflowing liquid to a thin laterally distended disc-like stream or sheet. The spreader 25 lies close to the bottom and its diameter only slightly exceeds that of the feed opening 20c, the whole structure functioning best where the spreader is of small size. Its lower edge 25' is spaced from the bottom by a plurality of depending lugs 25'', and the latter are shaped to fit down into the opening 20c, thus centering the spreader. Further, the lugs 25'' preferably take the form of short angular blades as best shown in Fig. 7, and obviously such liquid deflecting blades cause the entering liquid to take on a slight rotary action upon the floor or bottom 20. That action is preferably in the same direction as the whirling movement of the gas but whether the direction be the same or opposite, such movement of the liquid is an aid to the whirling gas in the breaking up of the shallow sheet of liquid emerging from beneath the spreader and moving toward the annular deflecting surface or rib 20a.

By preference, a dependable mechanical connection is completed between the spreader 25 and the elbow 24. Obviously the connection may be made between the floor or bottom of the unit and the spreader so that the spreader becomes an integral part, but most conveniently the connection is established between the elbow and the spreader, and they are used to clamp between them the bottom portion of the unit. If the bottom 20 be fixed to the body of the unit, it may serve to support both spreader and elbow. Under other conditions, the elbow will be fixed and will serve to support the bottom 20, as illustrated in Fig. 1. The preferred connection comprises a central bolt 26 extending upward through the elbow 24 and upon which the spreader 25 is threaded, after the manner of a nut so that it may be screwed down against the bottom 20 and at the same time draw the elbow tightly against that part. Or the bolt may be fixed in the spreader 25 and threaded in the bottom of the elbow, as shown in Fig. 2.

The spreader part 25 may be of various shapes. Several are exhibited in Figs. 1, 2, 6 and 9. By preference, it is provided with a small conical sink 25a in its top, as shown in Figs. 2 and 6. Notwithstanding the rapid whirling of the gas within the unit, there remains a slight tendency of the liquid in small measure to mount the spreader. Such liquid is caught and temporarily held in the sink 25. It there takes on the rotative motion of the whirling gas and being centrifugally discharged from the sink is thrown outward to join the incoming gas and the remainder of the liquid whirling within the unit.

As before indicated, it is not essential that the liquid be fed upward through the bottom of the unit. It is only necessary that the liquid shall reach that bottom and thus enter the closed end of the gaseous vortex. The liquid action is best when thus distributed from the bottom center of the unit, and obviously it is thus longest retained in the unit, being compelled to travel spirally from bottom to top thereof.

An alternative so-called internal liquid feeding arrangement is shown in Figs. 4 and 5; working to the same ends but permitting the liquid to fall through the top of the unit. As there shown, a central liquid duct, a tube C'', leads downward centrally within the contact unit C. It is lower end is stepped in the before-mentioned sink 20e and is thus held against disturbance by the whirling gas. And the liquid is discharged through openings 27 at the lower end of the tube. These openings may be horizontal slots of little height but wide and thus direct shallow streams across the floor or bottom 20. But by preference, higher openings 27 are used as shown in Fig. 4 and the control or gauging of the depth of the sheet of liquid is obtained by means of an inverted conical spreader 28, fixed on the lower end of the tube and spaced from the bottom 20. This downfeeding arrangement is advantageous when the liquid is to be drawn from an overlying floor or tray, after the manner shown in Figs. 4 and 14.

Figs. 1, 6 and 7 illustrate diagrammatically the manner in which the gas and liquid act within the described contact enforcing unit. As there represented, the liquid flows across the bottom 20. Meantime the gas at much higher velocity passes from the exterior to the interior of the unit through the many sub-dividing tangential openings 19. Taking on a consquent whirling motion within the unit and being prevented from escape at the bottom the gas perforce moves spirally toward and through the open top of the unit. Thus the unit is continuously occupied by a whirling and thick-walled hollow vortex of gas. Clearly the pressure of gas within the outer part of that vortex, while slightly less than that in the external space B, is nevertheless greater than the pressure at the axis of the vortex and the whirling motion tends to prolong the presence of the gas within the unit, the path of travel between the space B and the open top of the unit being greatly lengthened by the whirling motion.

The aggregate area of the openings 19 is ample and may exceed that of the outlet and the whirling velocity of the gas within the unit is but little less than the velocity of its entrance from the space B; and very considerable whirling force is attained and is exerted by the relatively light gas. The liquid flowing outward upon the bottom 20, and usually checked by a surface 20a, is directly exposed to the vortex and is quickly set into rotation and broken up upon said bottom. In this the whirling gas is aided by the described whirling discharge of the liquid by the before mentioned spreader and its angular blades 25''. The relatively thin sheet of liquid on the bottom 20 is greatly disturbed by these whirling motions and is quickly formed or broken into spray which is caught up by the whirling gas. The liquid particles are thereafter held in suspension within the gas by three forces. First, the supporting force of the upwardly spiralling gas; next, the inwardly directed or centripetal force of the entering streams of gas; and third, by the opposing centrifugal force developed by the described whirling motion.

In consequence of the next above described actions there is quickly established and always maintained within the unit a whirling wall of liquid particles, which wall rises from the bottom and extends to the top of the unit, as well represented by the dotted marks, L, appearing in Figs. 1, 6 and 7. That whirling wall or barrel shaped liquid body constitutes the foraminous wall before mentioned and obviously always occupies an intermediate position within the larger whirling wall or barrel of gas. As matter of course, the thickness of the said wall and the number of liquid particles comprising it must needs vary with the vigor of the whirling motion and with the density and other characteristics of the liquid employed.

In this manner the liquid is atomized, raised and continuously held as a barrier, through which all of the gas must pass before it can escape from the interior of the unit. Thus the most efficient and effective contact between gas and liquid is ensured, notwithstanding the rapidity with which the gas passes through the unit.

The gas may absorb or if hot, may evaporate, some or all of the liquid thus presented across the path which it is compelled to follow from one compartment to another. But as a rule a residue of liquid remains and is expelled from the top of the unit by the outrushing treated gas. Condensates, derived from the contact, by liquid transfer or by condensation, being then in the form of particles, merely join and become part of the described wall of liquid and are spirally ejected from the top of the unit. As must be apparent, the kind, quantity and nature of the liquid so expelled from the unit depend upon the natures, conditions and quantities of the gaseous and liquid substances thus intimately contacted. This is true also of the gaseous product of the unit. When the gas contains particles of solid matter such particles are centrifugally separated and ejected along with the liquid product.

When the weight of a liquid is compared with that of a gas, it is remarkable that so great a quantity of liquid can be broken up and raised in this manner but the fact is that the unit operated as here described comprises in itself a very effective liquid elevator or pump. For example, air whirling through the unit at a velocity corresponding to the pressure of one and one-half to two inches of water, is capable of lifting approximately four times its own weight of water. More specifically and dealing with a unit of approximately seven inches diameter and height, a flow of as little as three hundred fifty cubic feet (approximately twenty pounds) of air per minute serves to break up, raise and expel from the top of the unit, eighty or more pounds of water per minute, the liquid being fed to the unit as here described.

The explanation of the apparent impossibility appears to lie in the ease with which a thin layer or shallow stream of liquid may be disturbed and broken into minute drops, and thus atomized, by a gas sweeping over it. Next, the particles of liquid, because of the great increase of exposed area, are displaced and thus borne into suspension and in that state are easily whirled to the outlet of the unit. In other words, a liquid lifting device or pump of this description is relieved of the gross burden of lifting the liquid in mass and is merely called upon to displace very light particles thereof, thus involving a minimum expenditure of force.

Another matter of interest lies in the small loss of pressure as measured at entrance and exit of this contact unit while in operation. Strange as it may appear, when the flow of liquid is cut off and only gas continues to flow through the unit, the pressure drop increases, while generally the loss is lessened when the unit receives its "load" of liquid. The explanation appears to depend upon the centrifugal force developed within the unit; which obviously, resists or interferes with the free movement of the gas toward the outlet; and, when liquid is introduced, the liquid acts as a brake, tending to reduce the whirling velocity of the gas. Such reduction occasions a reduction of centrifugal force and in consequence the gas moves through the unit against less opposition. As pointed out, the atomized liquid in itself opposes little resistance to the upward movement of the gas stream in which it is suspended. Many practical advantages arise from these facts and are particularly to be noted in fractionating columns, where it is desirable to maintain the lowest possible pressure beneath each floor or liquid tray.

In some difficult fractionation and the like, it is highly desirable that the foraminous liquid wall maintained within the unit as above described shall be thick or heavy and shall be held in the path of the gas persistently. In such cases the unit may be made somewhat deeper of tuyère than here shown but, more practically, that object may be attained by making the outlet 21c of the unit smaller than the body of the unit, thus presenting the relatively overhanging abutment 21d before mentioned (see Fig. 6). The presence of that shoulder, by preventing a quick relief of whirling gas, results in delaying its discharge, actually lessening the pitch of the spiral or spirals followed by the whirling gas and moving toward the outlet. In consequence, the gas is caused to rotate more persistently and the liquid particles are longer retained in the zone of whirling contact.

In contrast to the expedient of the preceding paragraph, attention is called to Fig. 9 wherein the internal shoulder or annular abutment is omitted and the upper part 21x is of the full diameter of the body 18. Fig. 9 also shows that the tuyère blades may be struck or bent inward; this to be contrasted with the showing of Fig. 6. But mainly, Fig. 9 is intended to disclose a unit which is appropriate to cases which require less retention of gas and atomized liquid; instances of which will be found in many of the industrial arts. In lieu of the cast metal top ring before described, the unit of Fig. 9 is encircled by a pressed metal ring 21y, the outer part of which rests upon the floor 13.

It is desirable that a considerable depth of liquid be maintained upon the floor 13 belonging to a column, and units of the kind shown in Fig. 6, possessing cast metal tops, are mounted upon upstanding stools 29, usually integral with the floor 13; the top of each stool containing the before identified floor opening 14. In the case of Fig. 9 the same purpose is attained by the depth of the supporting part 21y, which tightly rests upon the relatively sunken floor 13. Incidentally, an encircling wall 30 is sometimes combined with the part 21y in order that the top of each unit shall be surrounded by a body of liquid occupying the annular space 31 and rising nearly to the top 32 of the unit body 18. This individual space 31 is characteristic of such units when grouped upon a floor which may be inclined. Another purpose is to provide individual "liquid seals" for the separator tops or heads about to be described.

Reverting now to the matter of whirlingly discharging gas and liquid from the tops of these units, it is first to be noted that it is sometimes feasible to allow the combined discharge to take place freely within any larger chamber. Indeed, such is the arrangement in the two compartments D and B shown at the top of Fig. 11, those compartments with their units C being there used as a direct contact vapor condenser; to which further reference will be made. In condensers and the like, it is immaterial what becomes of the ejected liquid so long as it ultimately falls within the reception compartment. But for the other uses, such as in fractionating columns, it is highly desirable that the gas, before being permitted to enter a succeeding unit, shall be very completely "dried"; in other words, relieved of entrained liquid.

To the end next above mentioned each unit preferably has combined with it a gas and liquid separator head or hood which receives all liquid rising within the unit and discharging it quietly on the floor 13, allows only the gas to escape into the open space above the floor and unit. If desired, at that time the liquid may be entirely removed from the presence of the gas but as a rule it will be permitted to collect upon a floor 13, thence to be removed and used as found expedient. Unsatisfied liquid exposed upon the floor is more apt to absorb gas or vapor from the overlying body than to contribute thereto. Thus, the gas which leaves this unit is ideally separated and conditioned for subsequent treatment in succeeding units or for other disposition. Also, it becomes possible to arrange many of these units within gas compartments of small dimensions; and, thereby the art is freed from many former limitations of gas velocity and structural design.

Comparison of the several drawings shows that the separator head of this invention may be single or duplex, and the liquid may be discharged therefrom in various ways. A single-stage head is depicted in Fig. 4 and for sake of simplicity in illustration such heads are employed in Fig. 11. Duplex heads appear in the other figures of the drawings, generally being preferred.

The function and operation of this separator and the need thereof being understood, attention is now directed to the novel mechanical constructions of the several separator heads herein depicted. The head is a component of the unit itself being directly combined therewith, and closely, with respect to the bladed portion of the unit.

The first element of the separator comprises an imperforate circumferential surface found at the top of the bladed portion of the unit. In Fig. 6 said surface comprises the inner face 21f of the abutment ring 21, which may be said to include also the annular abutment surface 21d. As shown in Fig. 9, the imperforate surface is presented by the part 21z, which there forms the top of the unit body 18.

Obviously, the described foraminous liquid wall persists in the form of closely assembled particles until the zone of propulsion is passed, but as soon as the particles rise above the level of the tops of the tuyère openings 19 they are released from the inward displacing force of the entering gas and by centrifugal force are projected against the described imperforate surface which becomes a collection surface upon which the particles are massed in film formation. Being still in rotation the liquid thus momentarily massed in the top of the unit is definitely positioned upon the periphery of the vortex of gas as the latter emerges from the unit. Thus the liquid, still under centrifugal propulsion, is positioned for discharge laterally from and across the margin of the unit outlet. In Fig. 6 the margin is identified as 21b whereas in Fig. 9 it is marked 32.

The second part of the separator comprises essentially a transverse ring or plate 33 containing a central opening 34 coaxial with the opening in the top of the unit but of somewhat smaller diameter, so that the inner margin of the plate 33 is in position to intercept the film of liquid which is driven upward upon the described collecting surface. In other words, the plate 33 becomes a deflector in the whirling path of the liquid, slightly infringing upon the whirling path of the gas. The plate is separated from the upper edge of the unit proper by a narrow annular space or slot 35 adequate for the discharge of the liquid but limiting the volume of gas that may escape therethrough. The plate is fixed in that position, either as shown in Figs. 2, 6 and 8 or by the means shown in Fig. 9.

The plate supports of the kind shown in Fig. 6 comprise three or more posts or lugs 36 which rise from the top of the ring 21 and the plate is clamped thereto by means of the before-mentioned bolts 23, which latter extend through said posts 36. The plate 33 of Fig. 9, for a reason to be explained, takes the form of an inverted cup, presenting the downturned wall 33' equipped with three or more angular lugs 37, which are clamped upon the unit supporting ring 21y by bolts 38, which hold that part upon the floor 13.

The central opening 34 in the plate 33 may constitute the final orifice of the unit as well shown in Figs. 4 and 11. But as a precaution against the escape of minute particles of liquid with the gas, a second fixed hood or plate 39 is usually added, the latter then containing the final orifice 40 of the unit. That orifice is best made slightly smaller than the opening or intermediate orifice 34 and is coaxial therewith. The part 34 is best provided with a downturned lip 41 at the margin of the opening 40 and adapted to aid in parting the residue of liquid from the outgoing gas. Preferably, the plate 39 becomes an inverted cup which is spaced from the plate 33 as by parts marked 39' in Fig. 6 or by parts marked 39'' in Fig. 9. This second hood plate 39 is secured by the same fastenings which hold the first plate 33.

By preference, the plate 33 rises at the margin of the opening 34, forming a slightly tapered flange and collecting surface 33'' which reaches nearly to a level of the margin or lip of the plate 39. An annular liquid reception space 42 is thus formed, the same communicating with the interior of the unit by way of the wider liquid discharge slot 43. A small residue of liquid which may fail of discharge through the lateral slot 35 is precipitated against the surface 33'' and is thereby conducted to the second discharge slot 43, thence falling within the space 42.

Due to the whirling impulsion of the outgoing gas, the liquid is discharged through the slots 35 and 43 with considerable force. Due to the presence of the described hood plates, which extend laterally, that liquid is directed into the lower part of the surrounding gas space B. The discharge of the liquid into that space may be direct, after the manner shown in Fig. 8, the liquid quickly settling into the body of liquid usually maintained upon the floor part 13. But the constructions illustrated in Figs. 6 and 9 are preferred over Fig. 8 because they afford liquid seals which control the discharge of the liquid and prevent the simultaneous discharge of gas through said slots.

As before mentioned, in most cases a considerable depth of liquid is held on each floor 13 and the passages leading from said slots are turned downward and are sealed or submerged in that liquid. This is accomplished by making both hood plates of inverted dish-like form. Thus, as shown in Figs. 6 and 7, each plate 33 has a depending down-turned flange 33' which extends nearly to the floor 13. Similarly, each plate 39 has a downturned flange 39a which likewise extends well below the level of the liquid maintained on the floor. Fortunately the pressure attained in the extension slots 35a and 39b is only slightly greater than that existing upon the surface of the surrounding body of liquid and therefore very slight submergence of the hoods is sufficient to maintain "sealing" columns of liquid in the spaces 35a and 39b. Free movement and discharge of liquid is not interfered with but thereby the discharge of gas beneath the outer edges of the hood parts is prevented. If permitted, such discharge of gas, like the discharge beneath an ordinary bubble cap, would tend to disturb the body of liquid on the floor and throw atomized liquid into the space B, which space should contain only "dry" gas.

The beforementioned stools 29 and the deep part 21y of Fig. 9 serve to elevate each unit with respect to its floor part and thus allow the sealing parts 33' and 39a to be of considerable depth, easily affording adequate seals.

It will now be clear that the described units are provided with separator adjuncts or components which, in addition to being highly efficient, cannot become clogged, which are capable of operating continuously and are readily installable upon the units and the floor or partition parts which support them.

Most conveniently, the complete unit is an article of compact form and relatively small dimensions and may be readily handled in and out of correspondingly small openings and spaces. On the other hand, the invention comprehends the direct combination of one or several units with a single floor part; an arrangement which enables installation of the multiple assembly as a single unit.

The differing uses of this invention make it desirable that the liquid shall be supplied to the described contact enforcing and separating units in differing conditions and from different sources. The kind of liquid to be employed and the manner in which it shall be conducted from its source will be predetermined to suit each case. It is usual to supply liquid directly to each unit and to immediately collect and discharge the liquid product.

In other cases, such as shown in Fig. 1 and provided for in Fig. 9, the liquid is circulated through the unit a number of times, to the end that a liquid product of concentrated form may be obtained.

In still other cases, and as represented in Figs. 2, 4 and 11, the liquid will be employed sequentially after the manner of the descent of reflux liquid in a fractionating column.

Still other arrangements will suggest themselves to those who are skilled in the art. Specific arrangements are represented by the drawings, as follows:

The casing 12 of Fig. 1 is of the kind generally made of cast metal and the casting includes not only the dividing floor 13 but also the liquid duct C' and a vertical extension 44 which opens through the floor 13 and rises far enough above that floor to serve as an overflow from the floor and maintain the depth of liquid which it is desirable to accumulate thereon. The fresh liquid enters through the valved pipe 45, passes upward through the unit in the manner before explained and is discharged upon the floor. From that point it recirculates or returns through the duct C' to the downpipe 44. When the total of liquid accumulated upon the floor reaches the desired level, the draining of finished liquid from the floor may begin, through the valved side-stream pipe 46. Obviously, the flow through feed pipe 45 may be stopped; likewise the flow through the drainpipe 46 may be partly or wholly checked, and in that case a given quantity of liquid will be repeatedly circulated from bottom to top and return, as well represented by arrows in Fig. 1. The effect on the liquid is determined by its own nature and the character and condition of the gas or vapor with which it is forced into contact, in the manner before explained. The gas also may be recirculated and, indeed, such recirculation of the gas may be required where the object is to change not only its condition but also the character or composition of the supplied liquid.

Aside from other uses, the structure of Fig. 1 is admirably adapted for employment as a stripper for refining the liquid products of fractionating columns and the like. Obviously, further compartments and contact units may be added for use in stripping operations and in that case the pre-separator A may be omitted or merely arranged to receive the steam which is used. The liquid to be refined will then be supplied through a connection 45.

The apparatus of Fig. 2 is like unto that shown in Fig. 1 except that a plurality of contact units are there arranged for the sequential admixture of the gas or vapor with liquid that descends from unit to unit. In each case it will be noted that while the valved pipes 45 and 46 are retained for the introduction and withdrawal of liquid the pipes 45 are normally closed and each downflow duct 44 is supplied with liquid from the floor or the compartment above it, the connection being established through a vertical coupling pipe 47 which, operating as an overflow pipe for the upper floor, leads liquid therefrom downward to the contact unit which lies below it. This arrangement is particularly suitable for small fractionating columns, strippers and condensers.

In the matter of direction of liquid feed the structure of Fig. 4 is like unto that of Fig. 2 but the larger casing 12x is of a width which accommodates a staggered arrangement of successive units, also permitting, but not limited to the employment of, the before described internal feed pipes C''. The normal liquid levels upon the floors are represented by the dotted lines 48.

Fig. 9 illustrates a modification of the liquid treating arrangement, comprising an individually attachable connection 49 which contains the duct C' and leads directly from the floor, downward to the elbow portion 24. The arrangement is convenient in many cases which require the installation of a plurality of units upon a single floor. Incidentally the upper end of the connection 49 is secured by the hollow nut 50. This may serve as the direct over-flow from the floor 13 or may receive a liquid transfer pipe 51 leading from the compartment above.

As before mentioned, during operation the lowest pressure zone within the contact unit is found upon the center or axis thereof and because of this low pressure the liquid may be taken or sucked directly from the floor which supports the unit. But when the operation is conducted with gas moving at very high velocity, it is sometimes desirable to supplement this pressure difference and to feed the liquid under a corresponding head. In such cases the arrangement of overhead feed should be employed as shown in Figs. 2 and 4. A greater head of liquid is rarely required.

Fig. 11 diagrammatically illustrates a combined vapor purifier, fractionating column and condenser, all in one tower and representing the novel apparatus in its entirety. The hot vapor enters the large lower compartment 52 tangentially through the nozzle or connection 53. The top of the compartment is formed by a floor 54 and the swirling vapor whirls downward against the inner wall 55 of the compartment 52. Liquid accompanying the entering vapor is centrifugally precipitated against the wall 55 and spiralling down the same, is discharged through a narrow circumferential slot 56, there entering a quiet pocket 57. Encountering the inclined floor section 58, the whirling vapor reacts in an upward and inward direction and escapes from the compartment 52 through the avenue provided by a relatively small whirl promoting tuyère 59 and its upward leading outlet 60. A conical reaction flange 61 extending from the top 59' of the main tuyère serves to throw off any liquid entering through the inlet 53 and displaced upwardly and inwardly beneath the part 54.

The tuyère top 59' presents an annular abutment surface 59'' and because of the presence thereof and because the partly purified vapor enters through the many tangential tuyère openings 59a of the tuyère 59, the vapor is caused to whirl rapidly therein and to spiral downward, toward and into the relief cavity or bottom bowl portion 61. In doing so the vapor displaces and carries with it such liquid as may be centrifugally separated by the whirling motion within the tuyère 59. That liquid is collected in the bowl 61 and is discharged through a narrow circumferential slot 62 in the bowl bottom, falling into the quiet reception pocket 63.

Upon reaching the bottom 61' of the bowl the whirling vapor reacts upwardly and escapes through the central outlet 60. A so-called reaction cone 64 is positioned upon the bottom 61' within the lower part of the tuyère 59, serving to prevent, in the now familiar manner, the escape of stray liquid from the tuyère 59. As shown, valved drains 57' and 63' are provided for the pockets 57 and 63. The "bottoms" are removed therethrough.

The vapor purifier next above described represents an important element of the fractionating tower here illustrated and is of a form better than that illustrated in Fig. 1. But the multistage centrifugal separator which forms the base of the tower in Fig. 11 is not specifically claimed in this application. Instead, it is described and claimed in a companion application, Serial No. 617,028, filed June 13, 1932.

The illustrated tower or column of Fig. 11 is presumed to be coupled with a petroleum still, the vapor from the latter entering through said nozzle 53. Following the cleaning of the vapor in this centrifugal chamber 52 and the smaller centrifugal separator 59, it enters the first compartment B and passes therefrom through a plurality of the described contact enforcing units C. Meantime, liquid reaches the units through the medium of suitable ducts C'. The vapor passes from one compartment to the next above it, until the uppermost compartment is reached, the performance of the units C in each case being as before described.

While the vapor is thus flowing from bottom to top of the tower, liquid may and usually does flow from the top toward the bottom of the tower. Ordinarily the liquid will be a light distillate of the same petroleum and that liquid is admitted through the pipe 65.

Most conveniently, the units are arranged as shown in Figs. 11 and 12. Where such arrangement is employed the cooler liquid from a supply pipe 65 enters a central well 66. As shown, the latter is also arranged to receive overflow liquid from the floor 67. Branch pipes or ducts lead from the bottom portion of the well 66 to respective contact units C and thus those units are constantly supplied with liquid for the described intimate contact with the passing vapor. A well of the same kind is provided in each floor and these wells are progressively connected by downpipes 68 so that the overflow liquid from one floor shall fall into the well below. Incidentally the well furnishes the needed liquid seal for the downflow pipe 68.

Ordinarily the reflux liquid is quite completely evaporated by the time the bottom compartment is reached and increases in density as it progresses downward. The different distillates are withdrawn as side streams through valved pipes 69 which lead from respective floors or trays in the tower. Thus the products of the units are determined by the temperature of the vapor entering the same and the temperature and density of the reflux liquid reaching respective units, quite as is usual in ordinary fractionating towers. But by the means here described the work of fractionation may be conducted more rapidly, more certainly and within much smaller apparatus.

As is common, the volume of vapor ascending within the tower remains substantially constant and the quality of the terminal vapor is determined by the number of contact treatments to which the original vapor is subjected. It will be understood that the four fractionating compartments above the floor 54 may be extended into a greater number. Further, such compartments may be grouped in the usual manner, it being unnecessary to take a side stream from each of the compartment floors.

Because of the efficiency of the described contacting process and unit, it now becomes possible to convert the top of the tower into a condenser for the terminal vapors which rise from the fractionating compartment of the tower proper. This is done by adding one or more floors and compartments 70, each equipped with its units C. In that case the liquid supplied for use in the unit may be water which enters through the pipe 71. The condensing liquid departs through the pipe 72 taking with it the condensate, derived from the condensation of the light vapors, and ensuring high vacuum in and throughout the tower.

This explanation of the condenser sections serves to illustrate the invention when used as a mere steam condenser. A pipe 73 is provided for exhausting non-condensible gases from the dome of the condenser section, as required to maintain a high vacuum.

The before mentioned process when employing a liquid which is not miscible with the condensate of the vapor treated, here involves only the use of a non-miscible liquid in the main liquid supply pipe 65 or equivalent. That process possesses the advantage of discharging through pipes 69 or equivalent a mixture of non-miscible liquids, from which stable condensates are readily separable.

Still other novel features and uses of this invention will be apparent to those who are skilled in respective arts. For sake of brevity the obvious details thereof are omitted but nevertheless will be found to be comprehended by the appended claims.

I claim:

1. The herein described process of treating gas in swift motion, that consists in first freeing the moving gas from entrained substances, then constricting the path of the purified gas, increasing its velocity, and restricting the gas to rapid vortexial action about an axis of forward movement, feeding liquid into the central portion and base of the gaseous vortex thus maintained and by the forces of such vortex atomizing the liquid and spirally retaining the liquid particles within and across the path of the whirling gas, thus ensuring contact of gas and liquid, progressively and abruptly terminating such admixture, separately discharging the resultant liquid product at a point axially distant from said base, and condensing the gaseous product.

2. The herein described process of enforcing contact and interchange between gas and liquid, that consists in organizing a rapidly moving stream of gas, at one point constricting its path, increasing its velocity, and restricting the gas to rapid vortexial action and advance about the axis of its general movement, feeding liquid to the central lower part of the gaseous vortex thus maintained, thus exposing the liquid to the forces of said vortex and thereby comminuting or atomizing the liquid and coincidently centrifugally and spirally retaining the liquid particles within and across the path of the moving gas, and, whirlingly discharging the resultant liquid and gaseous products distant from the region of liquid entrance.

3. The process of interchange as claimed in claim 2 and characterized by the repeated circulation and atomization of said liquid, resulting in the production of a concentrated product of the described contact.

4. The herein described process of enforcing contact and interchange between gas and liquid, that consists in organizing a rapidly moving stream of gas, at one point constricting its path, increasing its velocity, and restricting the gas to rapid vortexial action about the axis of its general movement, feeding liquid to the base of the gaseous vortex thus maintained, exposing the liquid to the forces of said vortex and thereby atomizing the liquid and coincidently spirally retaining the liquid particles within and across the path of the whirling gas, and at a point axially distant from said base, abruptly separating the liquid and gaseous products of such enforced contact.

5. The herein described process of enforcing contact and interchange between gas and liquid, that consists in organizing a rapidly moving stream of gas, at one point constricting its path, increasing its velocity, and restricting the gas to rapid whirling movement about the axis of its general movement and to slow spiral progress along said axis, toward a point of release, feeding liquid to the central interior of the gaseous vortex thus maintained, thus exposing the liquid to the forces of said vortex and thereby atomizing or comminuting the liquid, and thus centrifugally retaining the liquid particles in a state of dense suspension within and across the path of the spirally advancing gas, and, progressively discharging at said point of release the liquid and gaseous products of such enforced contact.

6. The herein described process of enforcing contact and interchange between gas and liquid, that consists in organizing a rapidly moving stream of gas, at one point increasing its velocity and restricting the gas to rapid vortexial and spiral action about the axis of its forward movement, continuously feeding a film of liquid to and radially across the base of the gaseous vortex thus maintained, thus exposing weak liquid masses to the forces of said vortex and thereby atomizing and centrifugally retaining the liquid within and across the spirally moving gas, and, whirlingly discharging the liquid and gaseous products of such enforced contact.

7. The herein described means adapted to continuously effect contact and interchange between gaseous matter in swift motion and matter added in a liquid state as required in processes of fractionation and the like, comprising a restricted reception passage for the gaseous matter, closed at one end and open at the other and constituting a whirl promoting tuyère adapted to set the gas in rapid vortexial action within itself and in slow spiral motion toward its open end, in combination with means adapted to feed said liquid centrally into the closed end portion of said passage substantially as described.

8. The herein described means adapted to continuously effect contact and interchange between gaseous matter in swift motion and matter slowly added in a liquid state as required in processes of fractionation and the like, comprising a restricted passage for the gaseous matter, which passage constitutes a whirl promoting tuyère adapted to set the gas in rapid vortexial action within itself and in slow spiral motion toward its outlet, in combination with means adapted to feed said liquid centrally into said passage at the base of the vortex so maintained therein, and a liquid and gas separating component providing the exit of said passage, substantially as described.

9. The herein described improved contact enforcing unit, comprising an axially extended hollow body portion open at one end and closed at the other, the open end being of less diameter than the interior of the body portion and the side walls of the latter containing a circumferential series of tangential gas entrance openings, in combination with means adapted to feed liquid centrally into the closed end of said body portion, as and for the purposes specified.

10. The herein described improved contact enforcing unit, comprising an axially extended hollow body portion open at one end and closed at the other and the side walls of which contain a circumferential series of tangential gas entrance openings, in combination with means adapted to feed liquid centrally into the closed end of said body portion, and, a liquid deflecting plate spaced from the open end of said body thus forming a circumferential slot for the discharge of the liquid product, and, said plate containing a central opening for the escape of the gaseous product.

11. The unit as claimed in claim 9 and having at its closed end means adapted to feed the liquid radially across said end in the form of a thin sheet.

12. The unit as claimed in claim 9 and having at its closed end means adapted to whirlingly feed a thin sheet of liquid radially thereon.

13. The unit as claimed in claim 9 and having in its closed end a peripheral liquid deflecting flange portion, closely adjacent the ends of the gas entrance openings.

14. The unit as claimed in claim 9 and having at its open end a ring-like top member containing a central opening coaxial with the body portion of the unit but of smaller diameter.

15. The unit as claimed in claim 9 and having spaced from its top a liquid deflecting plate of inverted dish-like form completing an annular liquid discharge duct, said plate containing a central opening of smaller diameter than the interior of the said body portion.

16. The unit as claimed in claim 9 and having at its top a duplex or two-stage liquid and gas separating component.

17. The herein described process of compelling contact and interchange between moving gas and supplied liquid that consists in tangentially deflecting the movement of the gas and restricting a vortex thereof to spiral movement toward a region of escape, concurrently comminuting liquid within such vortex and by the vortical action centrifugally resisting the discharge of the liquid, thus retaining the comminuted liquid in the form of a rotating and relatively thick foraminous wall within the vortex and thereby compelling the gas to travel within and through such wall before the gas may escape axially, permitting such escape and thereby centrifugally massing and ejecting the liquid product substantially at the beginning of the region of the gas escape.

18. The herein described process of compelling contact and interchange between moving gas and supplied liquid that consists in tangentially deflecting the movement of the gas and laterally restricting a vortex thereof to relatively slow spiral movement toward a region of escape, concurrently comminuting liquid within such restricted vortex and by its force centrifugally retaining the comminuted liquid in the form of a relatively thick foraminous wall rotating with and within the vortex so that the gas must penetrate the thick wall of comminuted liquid before either may escape.

19. The herein described continuous process of interchange which consists in admixing and thus contacting matter in a gaseous condition and swift motion with comminuted matter in a liquid phase and slow motion in the same direction, promptly releasing the mixture, and causing the residual propulsive force of the gaseous matter to progressively expel therefrom the liquid product.

20. The herein described continuous process of interchange which consists in admixing and thus contacting matter in a gaseous condition and swift motion with comminuted matter in a liquid phase and in slow concurrent motion accepted from the moving gaseous matter, promptly releasing the mixture, and causing the residual propulsive force of the gaseous matter to sequentially expel the liquid product laterally therefrom.

21. The process of interchange as claimed in claim 20 and employing a comminuted liquid which is non-miscible with a condensate of said gaseous matter.

22. The herein described improvement in the art of compelling interchange between gas and liquid that consists in forcibly and continuously raising and holding in and across the path of swiftly moving gas a foraminous wall composed of comminuted liquid and continuously releasing the gaseous and liquid products in an upward direction for subsequent separation.

23. The herein described improvement in the art of compelling interchange between gas and liquid that consists in centrifugally holding and raising by and in and across the path of swiftly and upwardly spiralling gas a foraminous wall composed of comminuted liquid and continuously releasing the resultant product in an upward direction.

24. The herein described improvement in the art of compelling interchange between gas and liquid that consists in centrifugally holding and raising by and in and across the path of swiftly and upwardly spiralling gas a foraminous wall composed of comminuted liquid, progressively releasing the mixture in an upward direction and then centrifugally separating the gaseous and liquid products.

25. The herein described improvement in the art of compelling interchange between gas and liquid that consists in setting gas into laterally restrained continuous swift spiralling motion, feeding liquid thereinto and thereby centrifugally and continuously erecting and holding in and across the path of the gas a foraminous wall composed of comminuted liquid, progressively discharging the mixture and products axially while discharging the accompanying liquid products laterally and preventing their re-entrainment.

26. The herein described improvements in the art of compelling interchange between gas and liquid that consists in setting gas into laterally restricted continuous swift spiralling motion, feeding liquid thereinto and thereby centrifugally and continuously erecting and holding in and across the path of the gas a foraminous wall composed of comminuted liquid moving concurrently therewith, quietly collecting and discharging the liquid resultant following the contact thus insured and finally discharging the gas in a "dry" state.

27. The herein described improvement in the art of admixing gas and liquid that consists in setting the gas in motion in an upward direction and in one or several stages admixing the gas with comminuted liquid also moving in an upward direction, utilizing the force of the ascending gas to that end, and, in each stage utilizing part of that force to separate the resultant liquid from the resultant gas, thus presenting the latter in a "dry" state ready for the next stage of its utilization.

28. The herein described improvement in the art of fractionation that consists in heating liquid to the point of predominant vaporization and immediately separating the unvaporized liquid from the hot vapor, then releasing the vapor in an upward direction and in one or several stages admixing the vapor with liquid which is in a state of comminution, utilizing the force of the ascendant vapor to move the comminuted liquid also in an upward direction, and, in each stage employing part of such force to separate the resultant liquid from the resultant vapor thus presenting the latter in a "dry" state ready for the next stage of its utilization.

29. The herein described improvement in the art of fractionation that consists in vaporizing the liquid and releasing the vapor in an upward direction, and, in one or several stages admixing the vapor with comminuted reflux liquid, utilizing the force of the ascending vapor to move the communited liquid also in an upward direction, and, in each stage employing part of such force to expel the resultant liquid laterally from the resultant vapor and thus presenting the latter in a "dry" state ready for the next stage of its utilization.

CHARLES GILBERT HAWLEY.